United States Patent Office 3,481,721
Patented Dec. 2, 1969

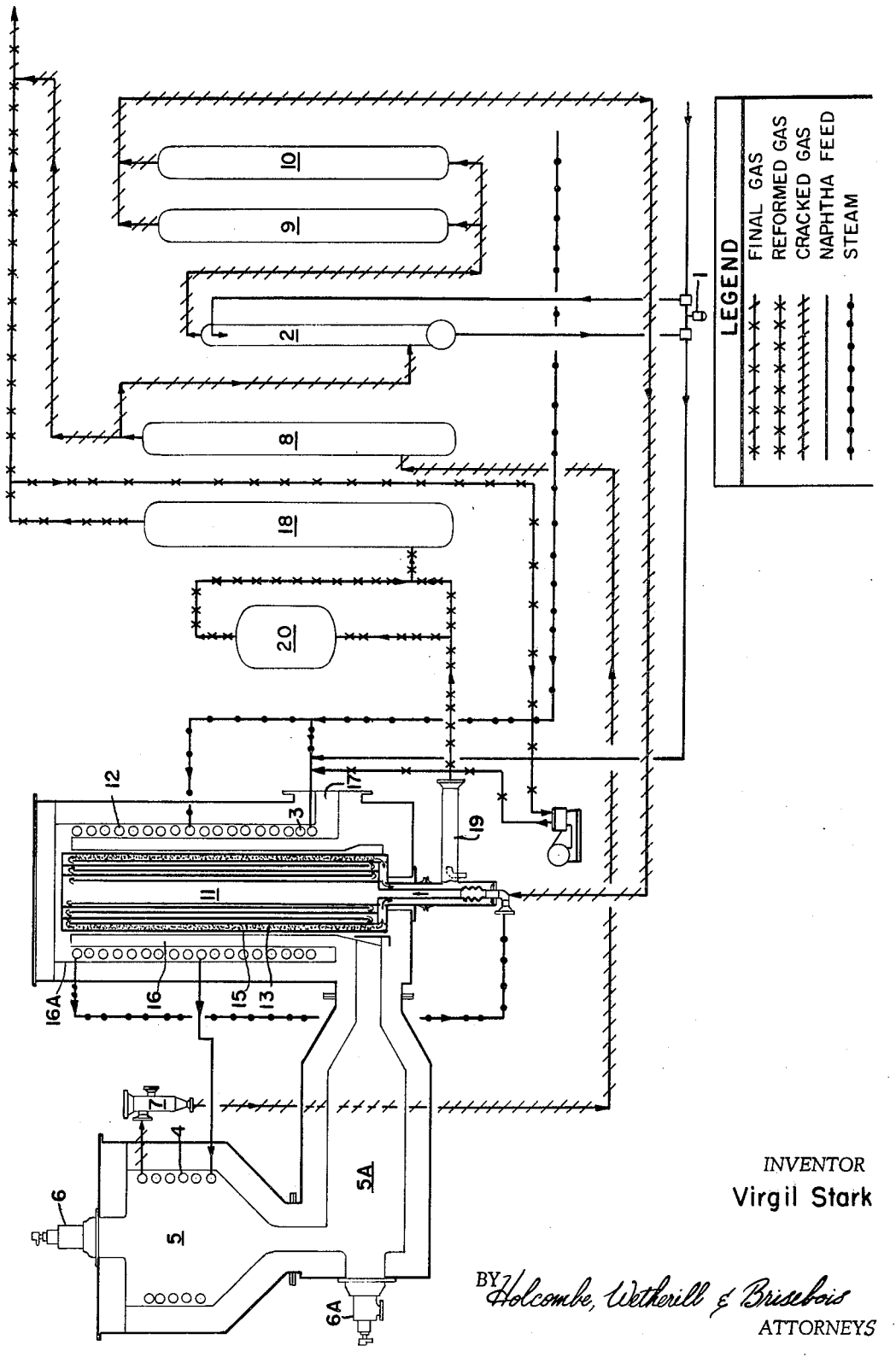
INVENTOR
Virgil Stark

3,481,721
PROCESS FOR MAKING FUEL GAS
Virgil Stark, New York, N.Y., assignor to North American Utility Construction Corporation, New York, N.Y.
Continuation of application Ser. No. 284,199, May 29, 1963. This application June 29, 1966, Ser. No. 561,646
Int. Cl. C10k 3/04, 3/02
U.S. Cl. 48—197    5 Claims

ABSTRACT OF THE DISCLOSURE

Cracking a liquid hydrocarbon under specific temperature and pressure conditions, removing the aromatics from the cracked gas produced, removing sulfur from parts of said cracked gas, reforming said sulfur free cracked gas under specific conditions and combining desired proportions of cracked gas, reformed gas and a gas diluent to obtain a gas with a desired heating value and gravity.

---

This application is a continuation of application Ser. No. 284,199, filed May 29, 1963, now abandoned, which in turn was a continuation-in-part of Ser. No. 94,003, filed Mar. 7, 1961, now abandoned.

This invention relates to a process and apparatus for the production of a gas from liquid petroleum hydrocarbons.

The ever increasing use of gas as a fuel for household and industry, makes it desirable to produce such a gas from inexpensive and readily available raw materials to either supplement existing, inadequate gas producing facilitities or produce a gas all year around as a prime source of supply in places where a supply of natural gas or manufactured gas is not readily available. It is also important to supplement, if necessary, the gas supply for seasonal peakload requirements.

In gas plants where present manufacturing facilities are inadequate or where they cannot meet sudden or seasonally increased demand, it is necessary to maintain standby manufacturing facilities to cover these peakload requirements. In this case, it is important to produce a peakload gas which is highly interchangeable with the gas being distributed to allow the highest possible substitution to satisfy the maximum possible demand without changing the burning characteristics of the sendout gas. This is particularly the case in plants where the gas distributed by the utility company is either a by-product gas obtained from outside sources such as coke oven gas, refinery by-product gas, and others or natural gas received all year around in the plant by pipeline.

It is the object of the present invention to provide a process for the manufacture of gas from a liquid hydrocarbon, a feedstock which can be stored at atmospheric pressure.

It is a further object of this invention to provide a process for standby purposes to supply gas having a wide range of heating values, gravity and burning characteristics for peakload requirements.

It is a further object of this invention to produce a gas which is highly interchangeable with a great variety of manufactured gases and also with natural gas having a range of heating values of, for example, 250 to 1,500 B.t.u./c.f., and gravities of 0.3 to 0.9.

It is a further object of this invention to produce a suitable gas for peakload, standby, or baseload purposes by a continuous process from one feedstock through a series of interrelated but distinct manufacturing steps, each step operating at optimum conditions to produce the desired gas of predetermined heating value, gravity and burning characteristics.

The preferred raw material for the process is a petroleum hydrocarbon which is liquid at atmospheric pressure having a boiling range from about 100° F. to 700° F. and is highly paraffinic. As examples of such hydrocarbon feedstocks, are natural gasoline, various naphthas produced in the refining of crude oil such as straight run naphtha, heavy naphtha, reformate, kerosene, gasoil, gasoline having a low octane number not suitable for motor gasoline blends and others. Such feedstocks can be stored in inexpensive tanks at atmospheric pressure. Some of these are available in many countries, particularly in the winter months, as by-products, such as natural gas condensates and by-products or intermediates of refinery operations.

The two single steps of the continuous process consist of the following:

(a) The thermal non-catalytic cracking of liquid hydrocarbon feedstock in the presence of a hydrogen rich reformed gas or (b) The thermal non-catalytic cracking of liquid hydrocarbon in the presence of steam and (c) The catalytic reforming of the cracked gas either produced as per (a) or (b) consisting mainly of lower molecular weight paraffins and olefins, or natural gas or LP gas with steam to produce a reformed gas containing essentially hydrogen, CO and $CO_2$ with a small amount of low molecular weight hydrocarbons.

The properties of the various types of gases which can be produced in the thermal cracking step can be varied by several means, such as by changing the thermal conditions employed during cracking, the space velocity, residence time and other parameters of the cracking step and also by changing the composition of the reformed gas and its ratio to the feedstock introduced in the cracking step. In this way, a gas having a range of heating values of from about 300 B.t.u./c.f. to 1,200 B.t.u./c.f. and a gravity (air=1) of 0.4 to 0.9 can be produced.

It is one of the principal advantages of this process to be able to change the properties of the gas produced, at will and over a wide range, that is, the heating value, gravity, composition, and implicitly the interchangeability with a variety of manufactured gases or natural gas.

The high heat value gas produced may be used as a substitute for natural gas, propane-air, high heat value refinery gas, oil gas and others.

The low heat value gases may be used as a partial or total replacement for coke oven gas, water gas, blue gas and other low heat value gases.

Details of each of the above steps are described below in combination with the vertical sectional flow diagram showing not only the above essential two steps of the process and the resulting gas flow, but also all other auxiliary steps of gas purification, cooling, heating, mixing, which are all integral parts of the entire process, together with the essential apparatus used for each step.

The apparatus used in this process consists of a series of reactors, furnaces and towers. For reforming a generator such as covered by U.S. Patent No. 2,465,666 is preferably used.

Other objects of the invention will become apparent from the description when read in conjunction with the accompanying flow diagram.

The process shown on the flow diagram defines the individual steps of the process and the equipment used for each step. The process consists of the manufacture of a gas, its purification and blending to obtain the sent-out gas of the desired specifications. The manufacture of the gas comprises the following basic processes:

(1) The manufacture of a hydrogen rich reformed gas,
(2) The cracking of a liquid hydrocarbon in the presence of said hydrogen rich reformed gas called hydrocracking, or (3) The cracking of liquid hydrocarbon in the presence of steam, called steamcracking.

The processes under (2) and (3) can be used simultaneously or separately or either one of them together with (1).

Both gases are produced simultaneously from the same feedstock whereby the hydrogen rich reformed gas is made from either hydrocracked or steamcracked gas; in turn part of the same cracked gas is catalytically reformed with steam into the hydrogen rich gas, which in the case of hydrocracking is recirculated into the hydrocracking step. For the start-up of the hydrocracking process, hydrogen rich gas is needed which must be introduced in the hydrocracking process. When enough hydrocracked gas is produced, a part of this gas is diverted for the reforming step. There are at least two alternate ways by which this can be accomplished. The cracking operation can start by introducing the naphtha which is vaporized in coil 3 with steam into the cracking coil 4 and obtaining a steamcracked gas having, for example, a gravity of 0.7 to 0.9 and a heat content of 1200–1500 B.t.u./c.f. after scrubbing and cooling in towers 8 and 2 and sulfur removal in towers 9 and 10. This gas is introduced into the reforming generator together with superheated steam from coil 12. As soon as hydrogen rich gas emerges from the low pressure scrubbing system 18, the steam which is introduced together with the hydrocarbon feedstock into coil 3 is shut off and is replaced by the hydrogen rich reformed gas coming from scrubber 18.

Another alternate procedure would be to start up the reforming generator 11, using as feedstock either natural gas or liquid propane gas, which latter can be stored under pressure in cylinders for this purpose. The reformed gas so obtained is used in the hydrocracking step and introduced in coil 3. The natural gas or liquid propane gas introduced in generator 11 is then replaced by the hydrocracked gas for the reforming step as soon as the hydrocracking step is stabilized.

In normal continuous operation of the process, the cold feedstock is fed by a proportionating pump 1 into scrubber 2 and into the coil 3, in which it is vaporized and preheated to about 1000° F. by flue gases. The feedstock is mixed with steam or hydrogen rich gas and passes first into the preheating coil 3 and then into the cracking coil 4 located in the cracking chamber 5, which chamber is fired directly with burner 6. As described later herein, the gas is heated in coil 4 to a temperature of 1100 to 1350° F., being combined either with superheated steam or with hydrogen rich reformed gas. The gas emerging from the cracking coil is then quenched in quench piece 7 and thereafter scrubbed in a tower 8. From this tower, part of the scrubbed gas goes into the main distributing line or gas holder after being stabilized and after its heat value has been automatically adjusted to the desired level by blending with other components as described below. Another part of this hydrocracked gas emerging from the scrubber, which is used to produce reformed gas, is washed with the naphtha feedstock in scrubbing tower 2 being cooled there enough to remove most of the aromatics contained in the cracked gas, the presence of which would not be desirable for the steam reforming reaction. The residual sulfur present in the scrubbed cracked gas is removed in the sulfur purification towers 9 and 10 to prevent poisoning of the nickel catalyst used in the reforming step. The emerging purified gas is mixed with superheated steam and enters the reforming concentric catalytic generator 11.

The superheated steam is produced in the upper coil 12 in the chamber formed around the concentric generator by the refractory walls 16 and 16$a$.

The reforming of the high heat value cracked gases which have been scrubbed and cooled, is accomplished in a concentric catalytic generator 11. In this generator, the high heat value cracked gas, mixed with superheated steam, passes between several concentric baffles of the generator body and finally through the catalyst bed 13 placed in the outer annular space between the outer shell of the generator and the fifth baffle. This annular inner space is filled with a nickel catalyst impregnated on a carrier of suitable shape and size. The outer shell 15 of the generator 11 is heated by the flue gases produced in the two furnaces 5 and 5A both fired respectively by burners 6 and 6A. The hot flue gases enter the inner space between the generator outer shell 15 and the refractory wall 16 and pass upward and then downward over the two coils 12 and 13, one for the super-heating of the steam 12, the second for the vaporization and superheating of the feedstock 3, and then to the stack 17. For a better utilization of the fuel, the flue gases before entering the stack may pass through a heat exchanger to recover part of the heat contained in the flue gases. The temperature of the recycled cracked gas entering the generator at the point of entrance is relatively low and is raised by mixing it with a large excess of superheated steam of 1000° F. to 1350° F., coming from the coil superheater 12. During the long passage of this mixture over the concentric baffles, the temperature is further raised so that at the point of entrance into the annular outer space containing the catalyst, the gas has a temperature in the order of 1350° F. to 1450° F. The chemical reaction which takes place in the catalyst bed is endothermic, the heat to sustain the reaction is supplied by transferring the heat of the flue gases through the outer shell of the generator, as the temperature of the flue gases heating the outer shell 15 is in the order of 2000° F., and the temperature in the catalyst bed is in the order of 1250° F. to 1450° F., the large temperature difference favors the heat transfer to the catalyst bed. The reformed gas temperature at the exit of the generator 11 is in the neighborhood of 1200° F. to 1400° F. The typical composition of this gas is 60% to 76% $H_2$, 3%–12% CO, 10%–15% $CO_2$ and 1.5% to 3% hydrocarbon (primarily methane and ethylene). This reformed gas has an average heating value of 250 to 300 B.t.u./c.f. and a gravity of 0.35 to 0.5. The reformed gas is quenched by a water spray immediately upon exit from the generator in quench piece 19. If it is desired to further reduce the CO content of this gas, then the quench cooling is operated in a manner to reduce the temperature of the reformed gas to about 700° to 800° F. and the gas is passed through a shift converter tower 20 containing an iron oxide shift catalyst. In the shift converter, the CO is reacted with additional steam to produce $CO_2$ and $H_2$. The converter gas at the exit has an average composition of 72%–78% $H_2$, 16% to 20% $CO_2$, 2%–3% hydrocarbons and 1%–3% CO. If desired the $CO_2$ can also be removed by washing this gas mixture with ethanolamine or potassium carbonate solution in an additional tower, to produce an essentially pure hydrogen or 90 to 99% hydrogen. This entire reforming operation is accomplished at pressures of 0.5 to 25 p.s.i.g. The pressure selected for the operation will be determined primarily by the quantity of gas to be produced, but also by other operating parameters such as the carbon to hydrogen ratio of the cracked gas fed into the generator, the steam to carbon ratio, the surface area of heat transfer, the heat flux through the shell, the flow rates of the gases through the baffles, the temperature of flue gases heating the outside shell, etc. Carbon dioxide may be removed from the reformed gas to produce a gas containing 90% to 99% hydrogen.

It has been found that no difficulty is encountered in reforming steamcracked or hydrocracked gases in the concentric catalytic generator under a variety of operating conditions. The cracked gases contain a large amount of olefins. It is known that the reforming of olefin rich gases in tubular reformers results in excessive carbon deposition in the catalyst and an olefin content of as little as 2% causes heavy carbon deposits in a very short time, even if a high steam to carbon ratio gas mixture is reformed, making it impossible to reform such olefin rich gases continuously for a long period of time. It has been found that in the concentric catalytic generator during long, continuous runs, no carbon deposits were formed in the catalyst bed, reforming steamcracked gases containing about 30% olefins, or reforming hydrocracked gases containing 10% to 15% olefins. The utilization of the concentric generator is considered to be one of the principal reasons for the trouble free continuous functioning of the present process allowing the recycle of the different types of high olefin content cracked gases into the reforming process and utilizing the reformed gas so produced for the hydrocracking process in one continuous operation.

VAPORIZING AND SUPERHEATING OF THE FEEDSTOCK AND STEAM

The liquid hydrocarbon feedstock is pumped into the preheating coils 3 located between the refractory shells 16, 16A surrounding the body of the concentric catalytic generator, by a proportionating pump 1. The diameter and length of the coil are selected so to obtain a relatively short residence time, as it is desirable that essentially no cracking should take place in this coil. The vaporized naphtha emerging from the coil 3 is heated to a temperature of 900°–1000° F. To better utilize the flue gases, superheated steam is produced in the upper coil 12 placed between the same refractory shells 16 and 16A surrounding the generator body. The steam emerging from this coil is superheated to about 1000° F.–1350° F.

CRACKING OF THE VAPORIZED NAPHTHA FEEDSTOCK

A. Steamcracking

If desired and particularly at the start up, the naphtha feedstock can be cracked in coil 4 located in furnace 5 in the presence of steam. The feedstock is preheated with steam in coil 3 and cracked at 1250° F. to 1350° F. by passing the mixture through the coil 4. The furnace 5 is heated by burner 6 firing fuel oil with excess air. The cracking coil 3 can be operated at pressure of 5 to 150 p.s.i.g.

Using a naphtha having a boiling range of 115° F. to 300° F., a specific gravity of 0.70, carbon to hydrogen ratio of 5.3, a heat value of 119,000 B.t.u./gal. and containing about 95% paraffinic hydrocarbons, the steamcracked gases after cooling and scrubbing have the following typical composition:

| | Percent |
|---|---|
| $H_2$ | 14.8 |
| $CH_4$ | 39.4 |
| $C_2H_6$ | 8.5 |
| $C_2H_4$ | 18.6 |
| $C_3H_8$ | 0.9 |
| $C_3H_6$ | 10.4 |
| $C_4$ | 5.7 |
| $C_5$ | 1.7 |

The gross heating valve of this gas is 1400 B.t.u./c.f., the gravity is 0.82. The composition of the gas can be changed and the gas yield varied by selecting the optimum temperature, pressure, steam hydrocarbon ratio and other parameters for the cracking. Using the above naphtha feedstock and steam at 1330° F., and 60 p.s.i.g. pressure, the gas yield under the above conditions is about 80%, based on the feedstock input, and the condensate obtained is a light, highly aromatic hydrocarbon mixture. This gas can be diluted with the low heat value hydrogen rich reformed gas to a heat value ranging from about 350 B.t.u./c.f. to 1000 B.t.u./c.f. by using more or less of the two gases produced in the proper ratio. Such a gas can be made to be highly interchangeable with a number of gases such as natural gas-air, propane-air or manufactured gas and can be diluted with air or flue gas to adjust the heating value and gravity to the desired level.

B. Hydrocracking

The vaporized naphtha emerging from the superheating coil 3 heated to about 900° to 1000° F. is mixed with a predetermined quantity of the hydrogen rich reformed gas in a ratio of from 30 to 150 c.f. of reformed gas per gallon of feedstock introduced the hydrogen rich reformed gas is produced in the concentric catalytic generator 11 at pressures up to about 25 p.s.i.g. To introduce this gas produced at lower pressure into the cracking coil 4 which may be operated at a pressure of 5 to about 150 lbs., it must be compressed to higher pressure if the operating pressure in the cracking coil is higher than the operating pressure of the concentric catalytic generator. No compression is required, however, if the cracking is operated at low pressure of for example 10 p.s.i.g. or less. The compressed reformed gas is introduced with the naphtha into coil 3 and heated to a temperature of 900° F. to 1000° F. before entering the cracking coil 4 located in heating chamber 5 which is fired by burner 6. The operating conditions of the hydrocracking process can be varied to suit the nature of feedstock and the desired properties of the gas to be produced. The operating variables are:

(a) The temperature of cracking, which can range from 1100° F. to 1350° F. and the temperature gradient;

(b) The residence time of the feedstock in the coil, which can range from 2 to 10 seconds;

(c) The amount of hydrogen rich reformed gas introduced together with the feedstock, which can range from 30 to 150 c.f. per gallon feedstock.

(d) The pressure at which the hydrocracking is accomplished; this can range from 5 to 150 p.s.i.g.

The cracked gas, after quenching, cooling, separating the condensable hydrocarbons by scrubbing, and purifying by removing sulfur, produces a high heat value gas having 900 to 1400 B.t.u./c.f. For example, using a light, paraffinic naphtha feedstock having a boiling range of 115° F. to 330° F., gravity of 0.70 C/H ratio of 5.3, heating value of 119,000 B.t.u./gallon, while introducing into the cracking coil per gallon of feedstock 80 c.f. of reformed gas, a gas was obtained having the following typical chemical composition:

| | Percent |
|---|---|
| $H_2$ | 42.0 |
| $CH_4$ | 14.2 |
| $C_2H_6$ | 7.1 |
| $C_2H_4$ | 9.9 |
| $C_3H_8$ | 0.8 |
| $C_3H_6$ | 3.6 |
| $C_4+$ | 5.2 |
| $CO$ | 2.3 |
| $CO_2$ | 14.9 |

This gas has a heating value of 930 B.t.u./c.f., a gravity of .71. The hydrogen rich reformed gas used in the hydrocracking operation had the composition of:

| | Percent |
|---|---|
| $H_2$ | 75.7 |
| $CH_2$ | 1.8 |
| $C_2H_4$ | 0.1 |
| $CO$ | 2.7 |
| $CO_2$ | 19.7 |

The operating conditions were: temperature of cracking, 1370° F.; pressure, 60 p.s.i.g.; residence time, five seconds.

In another experimental run of eight hours, duration under somewhat different experimental conditions, using natural gasoline as feedstock boiling between 106° F. to 180° F., having a C/H ratio of 5.15 and an API gravity of 81.4 cracking was achieved at a pressure of 15 p.s.i.g.

and at a temperature of 1390° F. using a purified hydrogen steam containing about 95% hydrogen—the rest CO and $CO_2$—in a ratio of 45 c.f. per gallon feedstock. The hydrocracked gas obtained had, after stabilization, the following typical analysis:

| | Percent |
|---|---|
| $H_2$ | 33.9 |
| $CH_4$ | 37.0 |
| $C_2H_6$ | 5.0 |
| $C_2H_4$ | 19.5 |
| $C_3H_6$ | 2.9 |
| $C_4$ | 0.5 |
| $C_5$ | 0.3 |
| $C_6+$ | 0.1 |
| CO | 0.6 |
| $CO_2$ | 0.2 |

This gas had a heating value of 980 B.t.u./c.f. and a gravity of 0.55. The gasification was almost complete and a small amount, of about 3% by weight of an aromatic liquid residue was separated upon cooling and scrubbing. Steamcracked gas of a heating value of 1400 B.t.u./c.f. or hydrocracked gas having a heating value of 800 B.t.u./c.f. can be diluted with reformed gas having a heating value of 280 B.t.u./c.f. with air or flue gas in the appropriate proportions to obtain a final send-out gas of the desired heat value and gravity.

The interchangeability of two gases depends on a number of factors. Formulae developed expressing the ratio of the heating value in B.t.u. to the square root of the gravity are not completely adequate to fully predict, but give generally a good indication of, interchangeability. Usually in periods of excessive demand, some sacrifice must be made either by supplying a higher heat content gas or being satisfied with a relatively low percentage of replacement or both. Only about 30% of propane air mixture of 1400 B.t.u. heat content and 1.25 gravity can be used as replacement for natural gas.

The low B.t.u. content gases—from 300 to 500 B.t.u./c.f.—produced in this process are due to their low gravity and closely adjusted heating value, highly interchangeable with a variety of low B.t.u. gases such as coke oven gas, blue gas, etc.

The medium heat content gases presently used for distribution of from 500 to 750 B.t.u./c.f., are usually natural gas, oil gas or liquefied propane gas-air mixtures of relatively high gravity of 0.85 to 1.3. The gases which can be produced by this process covering this heat value range can be made interchangeable with these above gases, particularly if air is being blended into the gas produced to increase the gravity.

The interchangeability of the high heat value (750 to 1050 B.t.u./c.f.) gases made by this process with natural gas or refinery gas, and particularly the gases produced by hydrocracking as described above, is relatively high due to the low gravity and high heat content of the gas which can be produced. A replacement of 50% to 80% can easily be achieved without sacrificing burning characteristics. Despite an appropriate heat value and gravity range for high interchangeability, a very high hydrogen content of a manufactured gas will limit the degree of interchangeability. If, therefore, a highly interchangeable high heat value, low gravity gas is required, it can be produced by this process by reducing the quantity of reformed gas used in the hydrocracking step to below 40 c.f./gallon feedstock and/or working at somewhat higher pressures in the hydrocracking step, thus sacrificing gas yield through incomplete hydrocracking by producing a certain amount of liquid condensates. Such a gas can also be produced by blending steamcracked or hydrocracked gas with air or flue gas.

The proposed process using the concentric catalytic generator will produce a low cost gas which can be manufactured according to requirements to replace a great variety of gases such as natural gas, oil gas and other manufactured gases. The capital investment in the plant is low and the operation of this continuous, efficient process is simple and the controls highly automated.

The main advantages of the process are that a readily available raw material can be used and only one feedstock is needed for the entire process. The feedstock is cracked in the presence of a hydrogen rich reformed gas which, in turn, is obtained by catalytically reforming the cracked gas. The cracked gas contains considerable amounts of olefins, the reforming of which in the present equipment and using this process, does not cause difficulties by coking up the catalyst bed. The composition, heat value and gravity of the gas produced can be varied over a wide range and heating values from 250–1400 B.t.u./c.f. gravities from 0.4 to 0.9 can be obtained at will to fit the local conditions and produce a substitute for the gas which is being distributed. Because of great similarity of heating value and gravity, the produced gas has a high degree of interchangeability with the gas being distributed.

I claim:

1. A continuous process for producing gas having a heating value in the range of 300 B.t.u./c.f. to 1200 B.t.u./c.f. and a range of gravity of 0.4 to 0.9, which comprises:
   (A) mixing a liquid paraffin hydrocarbon with hydrogen rich reformed gas from step (C), corresponding to 30 c.f. to 150 c.f. of hydrogen per gallon of liquid hydrocarbon feedstock, said hydrogen rich reformed gas having a hydrogen content of between 50% and 80% by volume, the balance being substantially carbon dioxide and carbon monoxide; catalyst free cracking said mixture by indirect heating at a temperature of 1100° F. to 1350° F. in a first direct fired furnace for a residence time of 2 to 10 seconds at a pressure of 5 to 150 p.s.i.g., so as to crack the higher hydrocarbons to essentially low molecular weight, gaseous paraffinic and olefinic hydrocarbons and hydrogen, quenching said cracked gas, scrubbing said quenched gas with hydrocarbon feedstock to separate aromatics, then purifying part of said scrubbed gas by removal of sulfur therefrom to obtain a high heating value cracked gas of 600 B.t.u./c.f. to 1400 B.t.u./c.f.
   (B) heating the flue gas from the direct fired furnace by passing it to a second direct fired furnace, and passing the resulting flue gas to a reforming generator for heating the latter, as stated in Step (C);
   (C) preparing a reformed hydrogen rich gas from a portion of the high heat value cracked gas of Step (A) by adding steam and reforming said cracked gas over a nickel catalyst in the reforming generator with heat derived solely from the combined flue gas from Step (B), at a temperature of from 1250° F. to 1450° F. and at a pressure 0.5 to 25 p.s.i.g., compressing said reformed gas to 60 to 150 p.s.i.g. to obtain the hydrogen rich gas used in Step (A);
   (D) adjusting the heating value of the remainder of said cracked gas by the addition of a diluent selected from the group consisting of the reformed gas of Step (C), air and flue gas, and compressing this mixture so as to obtain a final send-out gas of selected constant heat value and gravity and selected pressure.

2. A continuous process according to claim 1, wherein the liquid paraffin feedstock is a hydrocarbon having a boiling range of 100° F. to 700° F.

3. A continuous process according to claim 1, wherein the reformed gas is cooled to a temperature in the range of 600° F. to 800° F., and led with steam through a column containing iron oxide shift catalyst to convert most of the carbon monoxide and steam into carbon dioxide and hydrogen, said reformed gas containing 65% to 85% hydrogen and carbon dioxide, and having a heating value of 280 B.t.u./c.f. to 350 B.t.u./c.f.

4. A continuous process according to claim 1, wherein the reformed gas is cooled to a temperature within the range of 600° F. to 800° F. and led with steam through a column containing iron oxide shift catalyst so as to convert the carbon monoxide and steam into carbon dioxide and hydrogen and removing said carbon dioxide by an alkali wash to produce a gas containing 90% to 99% hydrogen.

5. A continuous process for producing gas having a heating value in the range of 300 B.t.u./c.f. to 1200 B.t.u./c.f. and a range of gravity of 0.4 to 0.9, which comprises:

(A) mixing a liquid paraffin hydrocarbon feed with steam; catalyst free cracking said mixture by indirect heating at a temperature of 1250° F. to 1350° F. in a direct fired furnace so as to crack the higher hydrocarbons in said feed to essentially low molecular weight, gas product composed of paraffinic and olefinic hydrocarbons and hydrogen, quenching said cracked gas, scrubbing said quenched gas with hydrocarbon feed stock to separate aromatics, purifying the scrubbed gas by removal of sulfur therefrom to obtain a high heat value cracked gas of 600 B.t.u./c.f. to 1400 B.t.u./c.f.;

(B) heating the flue gas from the direct fired furnace by passing it to a second direct fired furnace, and passing the resulting flue gas to a reforming generator for heating the latter as stated in Step (C);

(C) preparing a reformed hydrogen rich gas from a portion of the high heat value cracked gas of Step (A) by adding steam and reforming said cracked gas over a nickel catalyst in a reforming generator with heat derived solely from the combined flue gas from Step (B), at a temperature of from 1250° F. to 1450° F. at a pressure of 0.5 to 25 p.s.i.g.;

(D) adjusting the heating value of the remainder of said cracked gas by the addition of a diluent selected from the group consisting of the reformed gas of Step (C), air and flue gas, and compressing this mixture so as to obtain a final send-out gas of selected constant heat value, gravity and selected pressure.

References Cited

UNITED STATES PATENTS

| 2,692,193 | 10/1954 | Riesz et al. | 48—214 |
| 2,707,147 | 4/1955 | Shapleigh | 48—196 |
| 2,759,806 | 8/1956 | Pettyjohn et al. | 48—213 X |
| 2,860,959 | 11/1958 | Pettyjohn et al. | 48—213 X |
| 2,907,647 | 10/1959 | Linden | 48—214 |
| 3,120,430 | 2/1964 | Voelker | 48—214 X |

FOREIGN PATENTS 952,437  11/1956  Germany.

JOSEPH SCOVRONEK, Primary Examiner

U.S. Cl. X.R.

23—288; 48—93, 94, 213, 214